Feb. 16, 1960

G. H. LEONARD 2,924,989

JALOUSIE OPERATOR

Filed March 25, 1957

INVENTOR
George H. Leonard
BY Robert R. Finch
ATTORNEY

Feb. 16, 1960

G. H. LEONARD 2,924,989

JALOUSIE OPERATOR

Filed March 25, 1957

INVENTOR
George H. Leonard
BY *Robert Q. Finch*
ATTORNEY

Feb. 16, 1960 G. H. LEONARD 2,924,989
JALOUSIE OPERATOR
Filed March 25, 1957 6 Sheets-Sheet 4
Fig. 5.
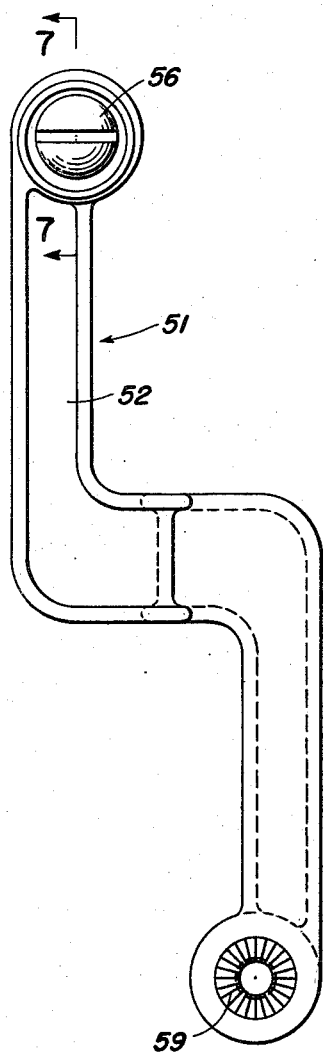
Fig. 7.
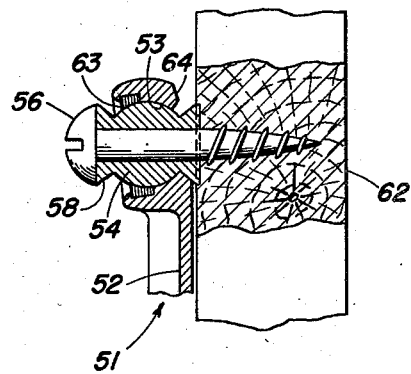
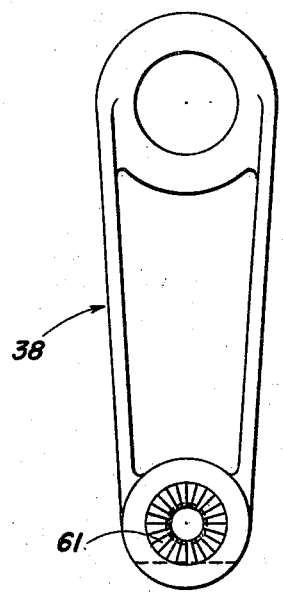
Fig. 6.
INVENTOR
George H. Leonard
BY *Robert R. Finch*
ATTORNEY

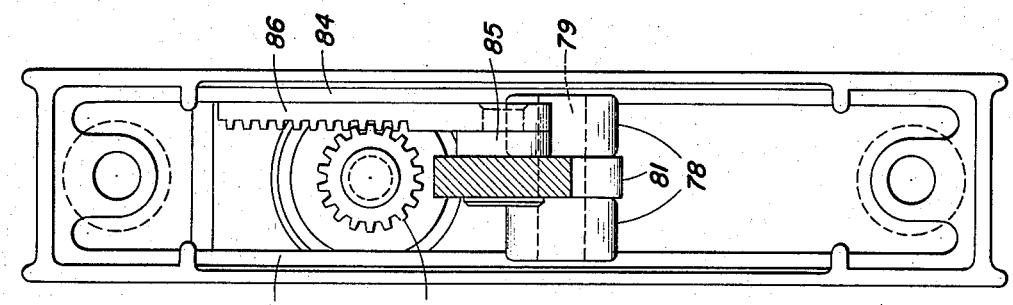
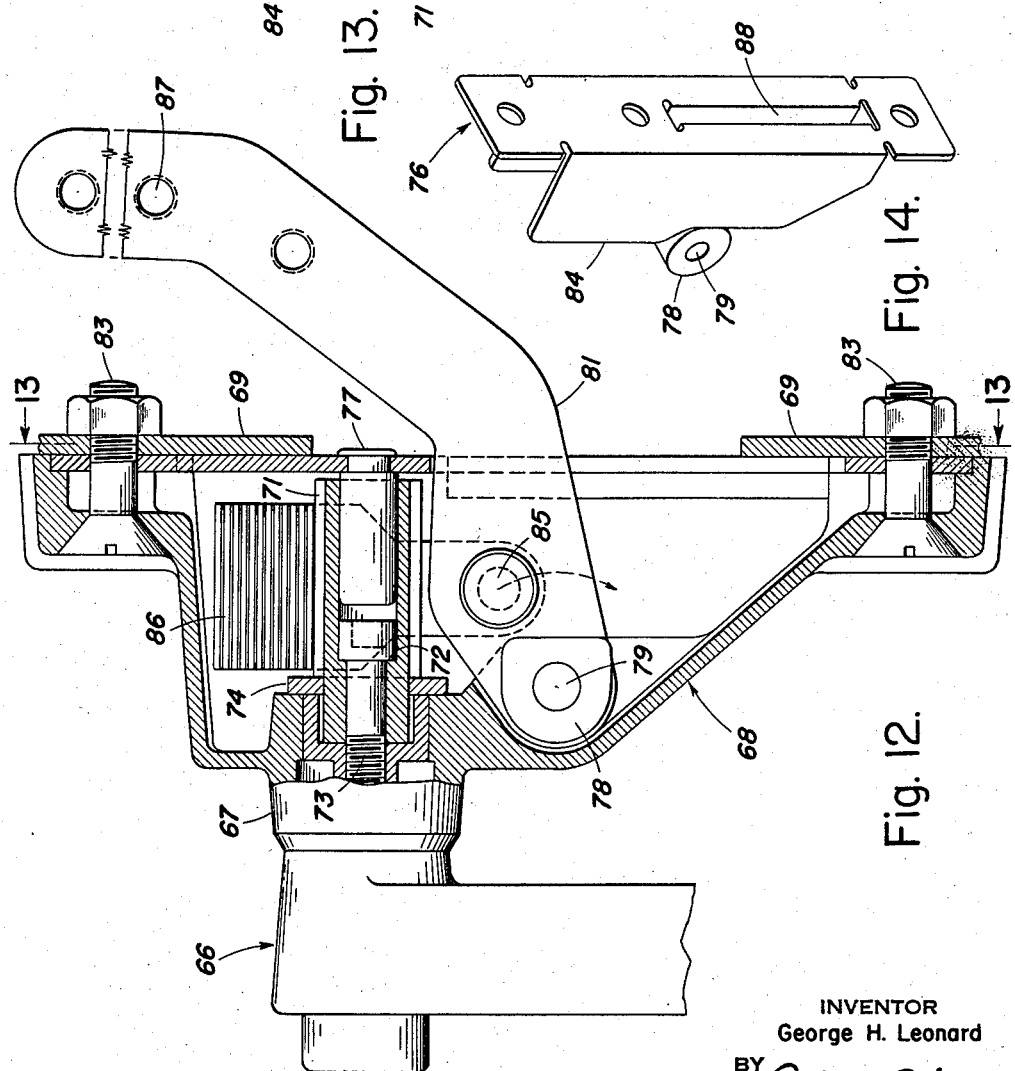

2,924,989
Patented Feb. 16, 1960

United States Patent Office

2,924,989
JALOUSIE OPERATOR

George H. Leonard, Darien, Conn., assignor to Genevieve K. Cal, doing business as Calko Die Casting Company, Stamford, Conn.

Application March 25, 1957, Serial No. 648,077

6 Claims. (Cl. 74—528)

This invention relates to devices, commonly called operators, for opening and closing louvers or jalousies. More particularly, it relates to an improved operator of the class described that is simple and economical of construction yet light and firm in operation.

Jalousie operators heretofore in use have taken a variety of forms, the most common of which employs worms and worm gears as the driving mechanism. Although such devices have been widely used, they are not all that is to be desired because of inherent design features.

A chief disadvantage of prior operators is their relatively low mechanical efficiency which, in structures employing worms and worm gears for instance, is usually as low as 30%, thus requiring a large amount of input motion to obtain the movement necessary to open or close the louvers.

Another characteristic of such prior operators is the fact that they usually have a mechanical advantage that is too high for proper control in the environment in which they are employed. This high mechanical advantage results in a great deal of damage to links and other elements of the jalousie operator because it is quite easy for a person to apply too much power to the operator in the final stages of opening or closing the louver.

Still another problem inherent in operators previously employed has been the lack of a suitable mechanically simple lock or clutch capable of setting the louvers in any one of a wide choice of positions. Such devices as have been heretofore employed usually depend upon pressure applied by the person using the device. This subjects the clutch mechanisms to non-uniform stresses since no two persons apply the same pressures. The result is that the units soon wear out and need replacement or repair.

An object of the invention is to provide an operator capable of operating jalousies with minimum effort and adapted to automatically lock in any desired position by the mechanical application of a uniform engaging force.

Another object is to provide a clutch adapted for use, inter alia, in connection with actuating levers for operating jalousies.

A still further object is the provision of improved lever arrangements for transmitting motion from the operator handle to actuate the louvers or jalousies.

The foregoing and other objects will become apparent to those skilled in the art to which this invention pertains from a perusal of the accompanying drawings in connection with the following description which is to be taken as illustrative and not limiting the invention, the scope of which is defined by the appended claims rather than by the description preceding such claims.

In the drawings:

Figure 5 is a view taken in the plane of line 5—5 of Figure 4.

Figure 6 is a view taken in the plane of line 6—6 of Figure 4.

Figure 7 is a view taken in the plane of line 7—7 of Figure 5.

Figure 12 is a partial side sectional view of a separate modification of the invention showing a particular construction for transmitting rotational motion from a handle and converting it to oscillating motion in a lever. This is not the equivalent of the lever arrangement illustrated in Figures 4–11, but is useful under different conditions where only limited space is available in the jalousie enclosure or frame.

Figure 13 is a view taken in the plane 13—13 of Figure 12, certain elements being omitted for purposes of clarity.

Figure 14 is a reduced perspective view of an insert forming a part of the structure illustrated in Figures 12 and 13.

Figure 1:
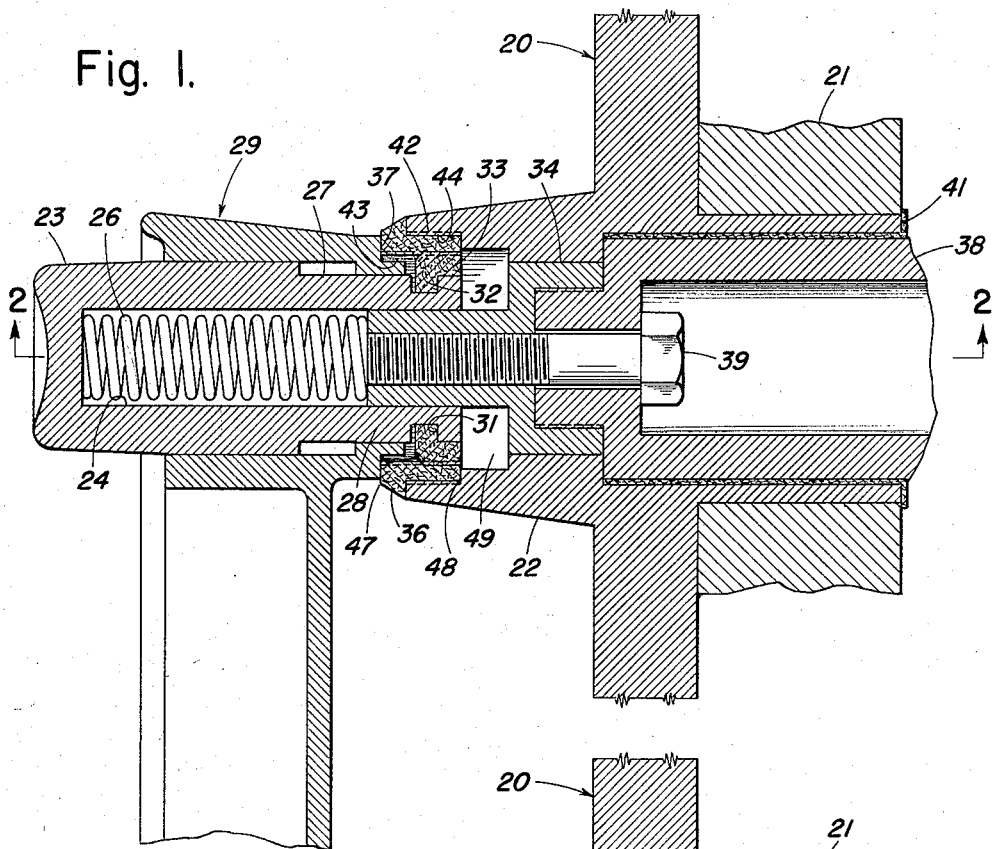
Figure 1 is a side sectional view of the handle portion of an operator illustrating details of the clutch of the invention, certain elements being shown in elevation for purposes of clarity and the clutch being shown in the closed or engaged position.
Figure 2:
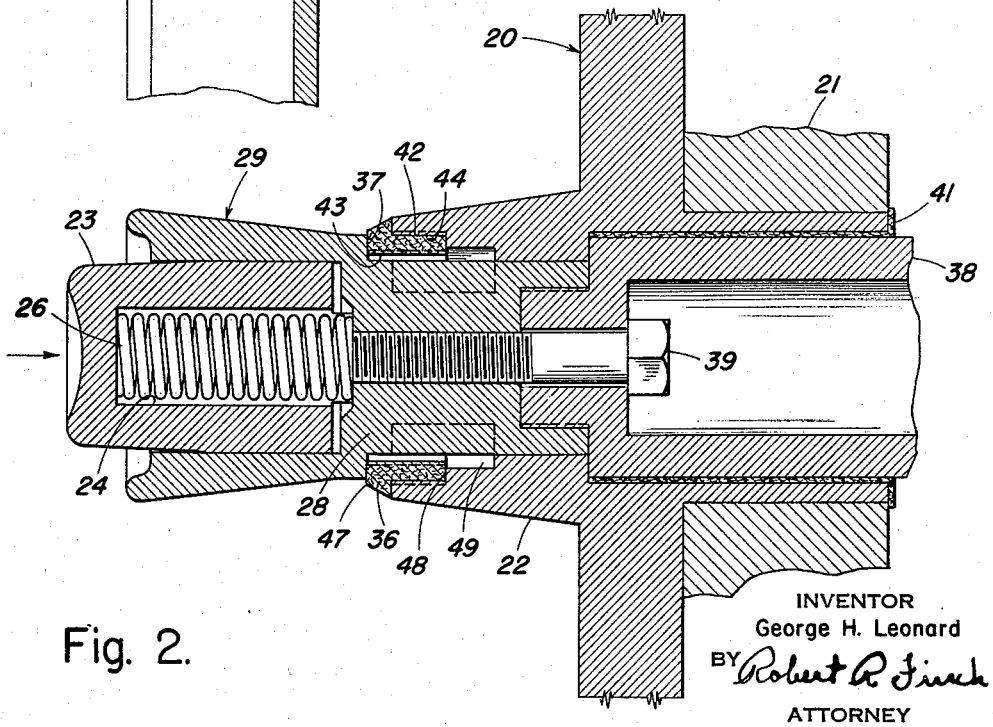
Figure 2 is a view taken in the planes of line 2—2 of Figure 1, but the clutch has been moved to the disengaged position, certain elements being omitted and others shown in elevation for purposes of clarity.
Figure 3:
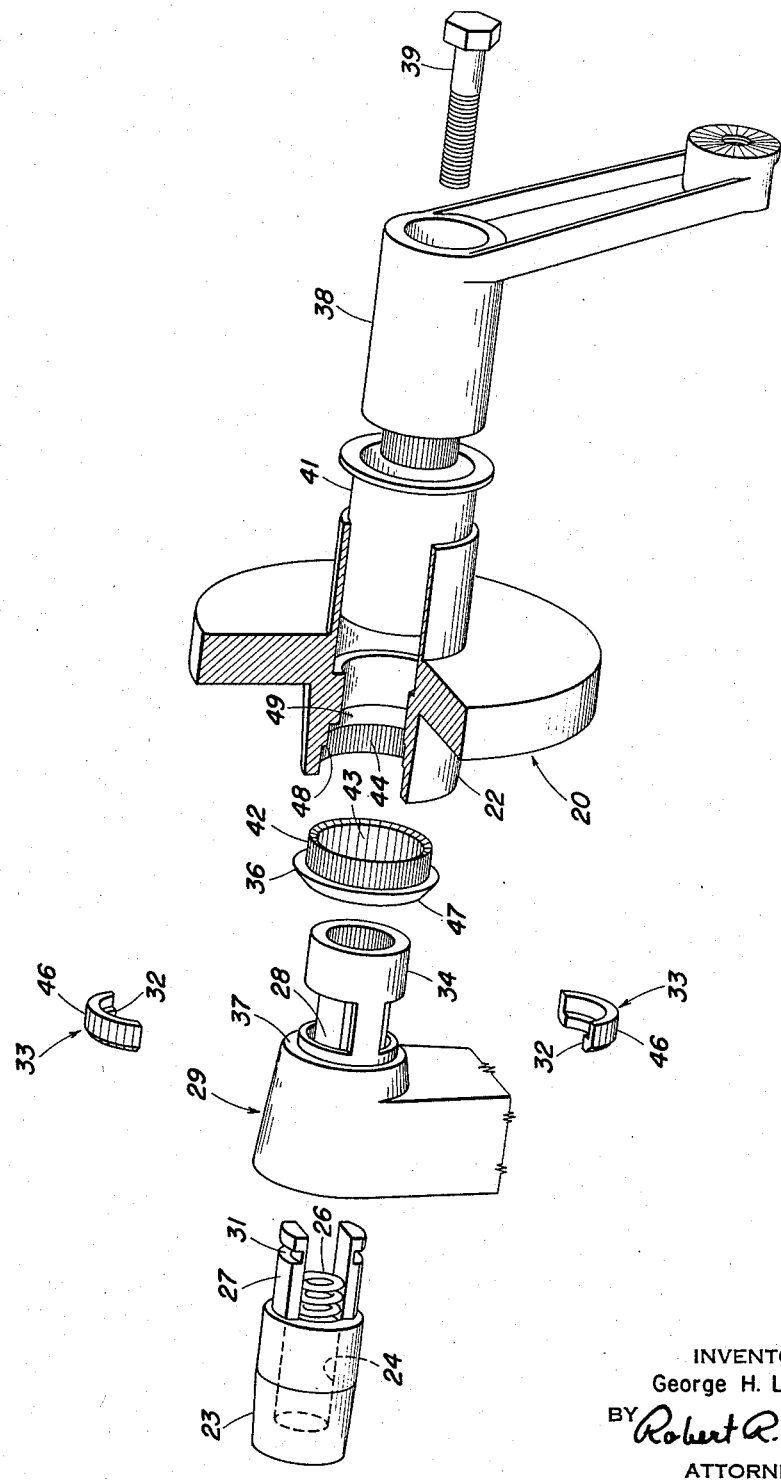
Figure 3 is an exploded perspective view of the handle and clutch device of the invention, certain portions being partially cut away for purposes of clarity.
Figure 4:
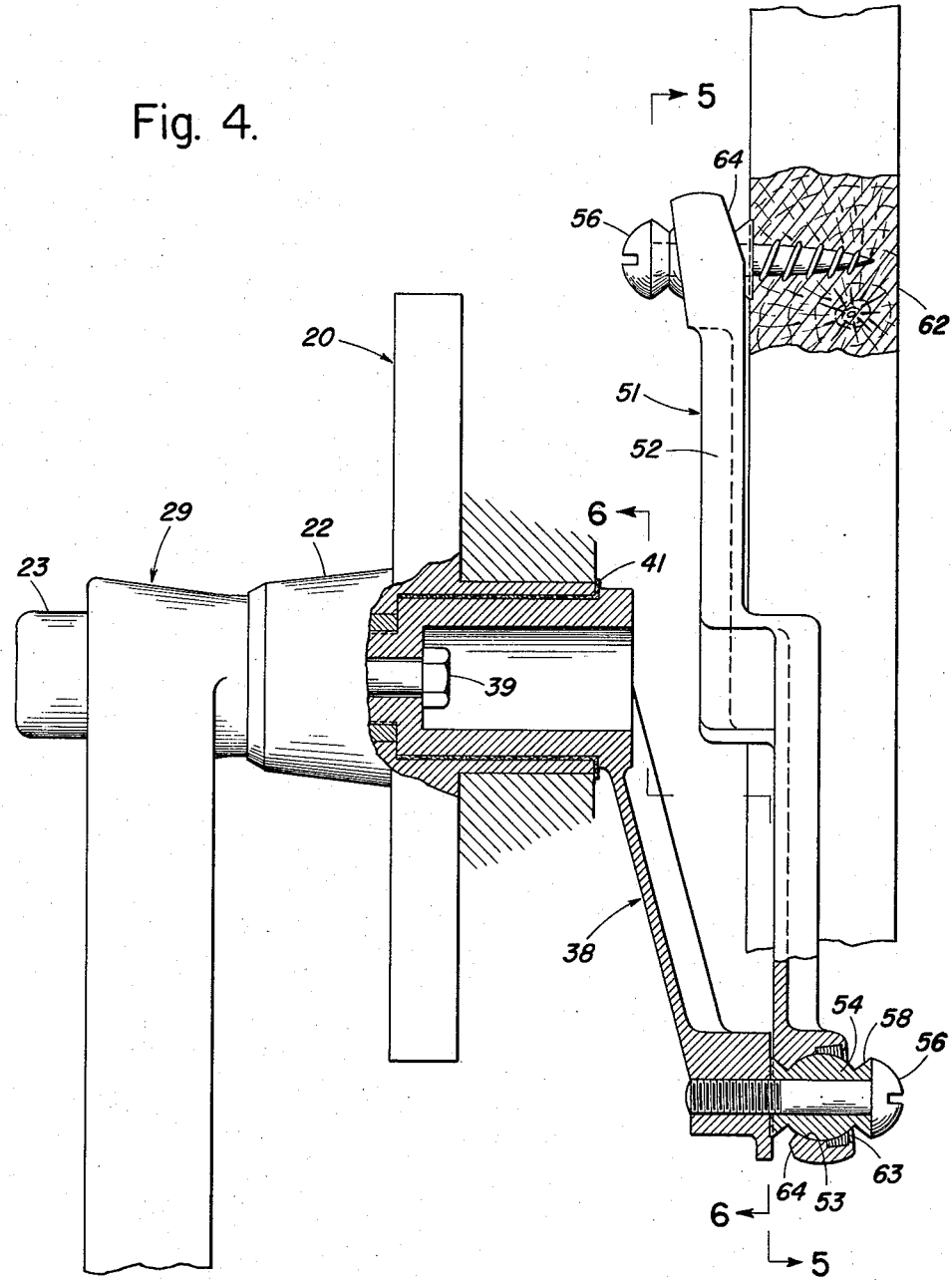
Figure 4 is a view of an assembled handle and clutch in association with a particular actuating lever structure provided by the invention, certain portions being shown as cut away and certain elements shown schematically for purposes of clarity.
Figure 10:
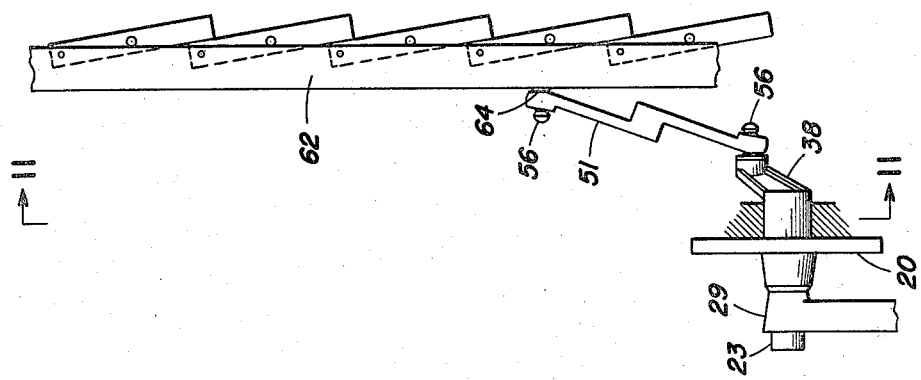
Figures 8–11 are simplified drawings showing the assembly of Figure 4 in combination with a louver or jalousie and illustrating in particular functioning of the actuating lever arm.
Figure 11:
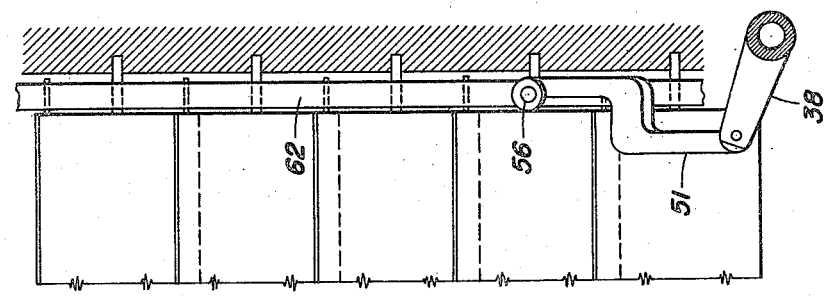

Referring particulary to Figures 1–3, the handle and lock assembly comprises a base member 20 which may take any desired shape suitable to the ultimate environments. Such plate is adapted to be secured by any suitable means (not shown) to a frame piece 21 of the window. A tubular section 22 is provided in the base member to accept and support the other elements of the device.

A push button or plunger 23 having a hollowed-out portion 24 and adapted to accept a compressible spring 26 is provided. Such button has spaced apart inwardly directed extension 27 adapted to slidingly fit through corresponding cut-out portions in an inner extended portion 28 of a handle member 29 in such a manner that the parts are keyed together and relative turning movement between the button and handle cannot occur while axial reciprocating or in and out movement of button 23 is permitted. Spring 26 is contained between such inner portion 28 and the back of hollow portion 24 of the button.

Each of the inward extensions 27 has a slot 31 adapted to receive and hold inner flange members 32 of a clutch segment 33 when the device is assembled.

To assemble the clutch and handle, button 23 is inserted into handle 29 so that extensions 27 pass into the cut-out portions of extension 28 of such handle. A bushing 36, which serves as a clutch element complementary with clutch segments 33 as hereinafter described, is fitted over a tubular extension 34 of the handle and against an inner shoulder 37. Clutch segments 33 are then fitted into slots 31 and are drawn by spring 26 into the engaged position as shown in Figure 1. The entire assembly may then be fitted into the tubular section 22 of the base member 20 and secured to a lever member or other driven device 38. The thus completed assembly may then be secured together by any suitable means such as cap screw 39. Obviously other fastening means for securing the assembly together, such as snap rings and the like, may be employed.

To minimize friction and thus enhance operation, a bushing 41, desirably of nylon or other self-lubricating plastic, is provided.

Engaging and disengaging of the clutch to enable movement and positioning of the handle in a desired location is accomplished by a unique arrangement of elements described below.

It will be noted that bushing 36, which is desirably of nylon to enhance turning relative to handle 29, is provided with serrations or splines on both the outer and inner surfaces (42 and 43) of its inboard cylindrical portion. The splines on outer surface 42 engage complementary splines on the inner surface 44 of section 22 thus holding bushing 36 against turning. Segments or elements 33 also are splined on their outer surfaces 46 and are adapted to engage the inner splined surface 43 of bushing 36 (Fig. 1). In connection with bushing 36, it will be noted that the inner splines do not extend its full length, but terminate short of its outboard end so that a rotational sliding relationship is maintained between the bushing and handle. Also, it is desirable for appearance and operational ease to provide a shoulder or flange 47 on bushing 36.

As best seen in Figures 1 and 2, bushing 36 terminates in section 22 at a shoulder 48 beyond which is provided a smooth-walled recessed portion 49 adapted to receive segments 33 when button 23 is depressed as in Figure 2. This permits turning of handle 29 (button 23 turning with it) to any desired position in which it is locked simply by releasing button 23. The serrations or splines on clutch elements 33 and 36 thus cooperate to enable locking the handle in virtually any position.

In connection with the clutch itself, it is to be noted that the engaging pressure which brings the elements into engagement is at all times uniform since it is applied by the spring 26 rather than by a person operating the device. As shown in the drawings, splines are also provided in link 38 and handle extension 34 to securely lock them against relative movement.

In addition to simplicity of construction and operation, the described embodiment is well adapted to die-casting manufacturing methods as will be obvious to any person skilled in such methods.

Figures 4–7 illustrate a particular lever especially adapted for use with the clutch and handle device as a jalousie operator while Figures 8–11 illustrate operation of a jalousie with such device.

In Figures 4–7 the lever 51 is shown as comprising a body portion 52 having its opposite ends offset and provided at each such end with a spherical recess 53 adapted to accept and hold a ball member 54 through which pass machine or wood screws 56 to secure the lever ends to a connecting member or link 38 (see also Figures 1–3) in turn connected to handle 29 by screw 39 as previously described. It will be noted that the mechanical effect of link 38 is to provide a connection on the rotatable handle at a point axially remote from the longitudinal axis of such handle thereby enabling conversion of rotational handle movement into linear motion of the lever 51. The protrusions 58 on balls 54 are serrated or radially splined as at 59 to engage corresponding splines 61 on the end of link 38. Such serrations may also be relied upon to dig into and frictionally engage jalousie member 62. In this manner the balls 54 and screws 56 are fixed against rotation thus eliminating loosening of the screws by repeated use of the device yet relative movement between lever 51 and balls 54 is permitted on the ball-and-socket principle.

To enhance freedom of movement and economy of construction, balls 54 are desirably made from nylon or other material providing a smooth bearing surface.

In the modification illustrated, balls 54 are secured in place within sockets 53 by a construction in which the lever ends are formed as single parts having a formed recess in which ball 54 is held by a retainer ring 63 in turn held in place by spinning the edge of lever 51 over the ring.

In order to accommodate changing attitudes of lever 51 during operation, each end of the lever is provided with a beveled portion 64 which slopes away from the point of contact of the ball with the link (or the jalousie frame as the case may be) and toward the lever end.

Figure 8:
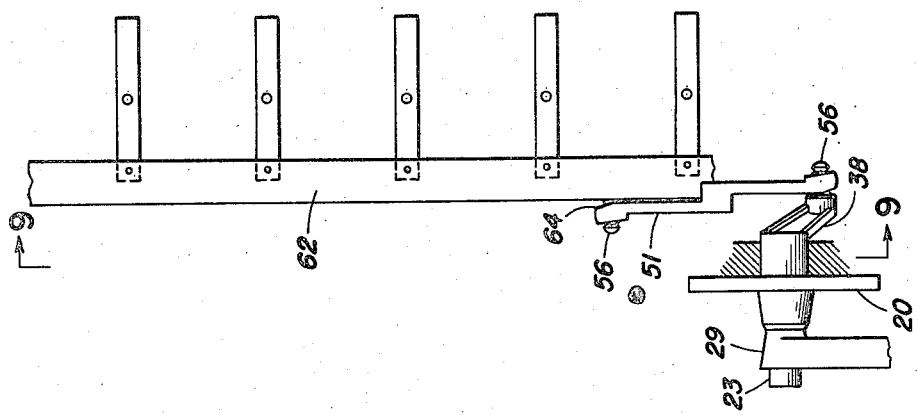
Figure 9:
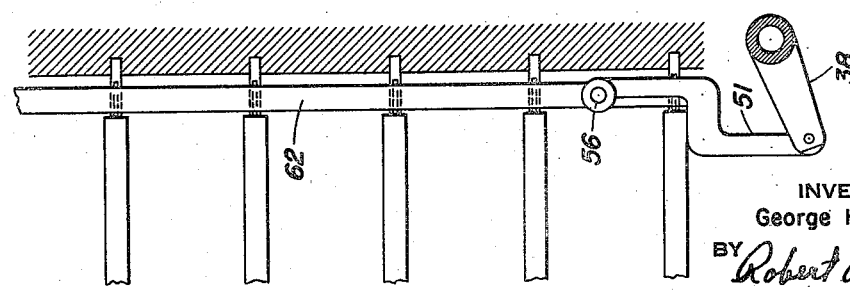

In Figures 8–9 the jalousie is shown in the open position and it will be noted that the lever 51 is substantially at right angles to the longitudinal axis of the button and handle. Upon releasing the clutch and turning the handle the jalousie is moved to the closed position (Figures 10–11) and the lever 51 departs from the right angle position but no binding occurs due to the bevel portions 64. Thus the bevel provides a definite feature of advantage because it permits snug fitting of both lever ends thus obviating the need for leaving slack to accommodate the above described changes in lever attitudes.

It is also to be noted that offsetting of the lever ends enables working in closer spaces since it allows arcuate movement of one end of the lever yet keeps the other end closely adjacent the louver members and frame.

In the modification illustrated in Figures 12–14 the handle, generally designated 66, is similar in construction and operation to that previously described hence a detailed description thereof need not be repeated. Obviously other handles and clutches may be employed with the construction if desired. However, the clutch and handle of the invention is to be preferred as it, when combined with the mechanism about to be described, forms a jalousie operator that is simple of construction yet capable of opening or closing and locking the largest jalousies with ease.

In the structure, the center section 67, which corresponds generally to section 22 of Figures 1–3, is formed integrally with a housing 68 enclosing and supporting a lever actuating mechanism hereinafter described, such housing being in turn secured to the face of frame members 69.

The operating mechanism comprises a pinion or wide gear 71 conveniently formed from a length of splined pinion stock and hollowed out in such a manner that a shoulder 72 is formed adjacent one end against which a cap screw presses to hold the assembly together so that pinion 71 is in effect an extension of the handle. Obviously other holding means may be employed if desired.

To provide a bearing against longitudinal movement of wheel 71, washer 74 is provided which bears against the inner end edges of the handle 66 and center section 67. An insert 76 (Fig. 14) is provided which forms inner side walls and back of the housing 68 and also provides support for a stud 77 serving as a bearing support on which pinion 71 is journaled for rotation. Lugs 78, in which a pin 79 is journaled to support one end of a lever 81, are held in place by insert 76. It will be noted that when the unit is assembled and secured to a frame member, as by bolts 83, insert 76 is also held in place in such a manner that one of its side walls 84 serves as a bearing or sliding support surface for a wide rack 86. Rack 86 is geared or splined on its inner face to engage pinion 71 thereby enabling reciprocating movement of the rack in response to rotational movement of the handle and pinion 71 while permitting unrestrained motion of the rack axially of the pinion to accommodate the arcuate motion that occurs as the bottom of the rack moves lever 81. Such motion being indicated by the broken arrow. At one end, rack 86 is provided with a lug and pin assembly 85 in turn journaled in lever 81 at a point inboard of the supported end of such lever. At its opposite or free end, lever 81 is provided with means, such as openings 87, enabling attachment to a jalousie to open and close the same. In order to provide flexibility as to degree of movement, several connecting means are provided at the free end of the lever.

In accordance with the invention, the combination of an elongated pinion and wide rack serve distinct functions and provide definite advantages. In the first place, the area over which the power is transmitted from pinion to rack is increased thereby eliminating localized load on individual teeth. Also, as noted above, the rack bottom follows an arcuate path as it moves the lever and this would cause twisting and binding of a narrow rack. However, the wide rack of the invention resists twisting or cocking and instead slides axially of the pinion so that the entire rack follows an arcuate path. In connection with the rack, it is also noteworthy that it is well supported by the bearing wall 84 and is thus prevented from rolling motion around the pinion.

The arrangement illustrated is of a type having an inherently high efficiency on the order of about 90% thus enabling opening and closing of louvers with relatively little motion input. The mechanical advantage of the arrangement is adapted to be matched to the work to be done thereby eliminating the danger of damage due to the inadvertent application of excessive force.

In connection with the lever, it will be noted that its movement is oscillatory in nature and substantially within a single plane, such movement being generally in a plane limited by slot 88 in the back of insert 76 through which the lever passes. Such single plane motion is different from the motion of the lever previously described because in such earlier described modification one end of the lever moves in one plane while the opposite end moves in a plane at right angles to the first. As a consequence of such movement, relatively more space is required to house such a lever arrangement than is needed for the arrangement of Figures 12–14.

Other elements of construction are similar in the two modifications described. For instance, positive locking of pinion 71 to handle member 34 may be insured by carrying the splines to the end and engaging them in internal splines of member 34.

I claim:

1. A construction including a handle member, a driven member and clutch means enabling holding of said handle and said driven member in any desired position; said construction comprising the mounting of said handle member for rotation on a fixed tubular base member, means connecting said driven member to said handle member thereby enabling movement of said driven member with rotation of said handle member, a hollowed out portion in one end of said handle member in axial alignment to said tubular base member, said clutch means comprising a spring loaded plunger slidably mounted in said hollowed out handle portion for reciprocating in and out movement, said plunger and handle being keyed together against relative rotational movement, a first clutch element on said base member and a complementary clutch element adjacent the inner end of said plunger adapted to be urged by said spring loaded plunger into cooperative engagement with said first named clutch element thereby holding said handle against rotational movement relative to said base member.

2. A construction according to claim 1 in which said first clutch element comprises a longitudinally splined surface of said base member, said complementary clutch element comprises a member splined to engage said first clutch element, and a smooth walled recess is provided to accept said complementary clutch element when the same is disengaged from said first clutch element by inward movement of said plunger.

3. In a jalousie operator comprising a rotatable handle, a clutch on said handle and a driven member adapted to open and close jalousies; a lever-attaching location on said rotatable handle at a point axially remote from the longitudinal axis of said handle, and said driven member comprising a lever member having a body portion the opposite ends of which are offset from each other, a ball mounted for movement within a socket at each end of said lever member, means enabling attachment of one of said balls to a jalousie to be operated and attachment of the other of said balls to said lever-attaching location on said handle, and clutch means on said last named ball adapted to engage complementary clutch means on said attaching location thereby holding said ball and said location in fixed relationship while enabling relative movement between said lever and ball.

4. A jalousie operator according to claim 3 in which the opposite ends of said lever member are bevelled from adjacent the point of contact of the balls with the handle and jalousie toward the ends of said lever member and away from said contact points to accommodate changes in attitude of said lever member during operation thereof.

5. A construction including a rotatable handle, a clutch, and a member adapted to convert rotational movement into oscillating movement, said member comprising an elongated pinion forming an extension of said rotatable member, a wide rack having a smooth side as well as a geared side in engagement with said elongated pinion, a lever member pivotally secured adjacent one end and having its opposite end adapted to be secured to a driven element, means pivotally connecting one end of said rack to said lever member intermediate the ends thereof, and a housing enclosing said pinion and rack and having a wall thereof in supporting engagement with the smooth side of said rack.

6. A handle assembly comprising a tubular base member adapted to be secured to a fixed support, a rotatable handle member having a hollow portion and adapted to fit concentrically with said base member, a plunger having a pair of parallel extensions and adapted to fit into said hollow portion of said handle with said extensions serving as keys limiting relative rotational movement between said handle and said plunger, a recess in said plunger, a spring in said recess compressible by movement of said plunger inwardly of said handle, a bushing around said handle and secured to said tubular base member, a portion of the inner circumference of said bushing being splined in a longitudinal direction, a smooth walled annular recess in said base member inwardly of said splined portion of the bushing, said plunger extensions being adapted to extend beyond said splined portion into said recess upon depressing said plunger, and splined elements on said extensions adapted to engage said splined bushing portion under pressure from the spring to lock the handle against rotation and movable with said extensions into non-engaging position in said recess to free said handle for rotation upon depressing said plunger.

References Cited in the file of this patent

UNITED STATES PATENTS

| | | |
|---|---|---|
| 1,601,824 | Goldsmith et al. | Oct. 5, 1926 |
| 1,831,955 | Harney | Nov. 17, 1931 |
| 2,156,200 | Smyers | Apr. 25, 1939 |
| 2,449,516 | Shakespeare et al. | Sept. 14, 1948 |
| 2,454,122 | Barger | Nov. 16, 1948 |
| 2,588,108 | Griffiths | Mar. 4, 1952 |
| 2,639,014 | Manschauer | May 19, 1953 |
| 2,788,103 | Requa | Apr. 9, 1957 |
| 2,811,866 | Buchanan | Nov. 5, 1957 |